(12) United States Patent
Yi et al.

(10) Patent No.: US 12,340,105 B2
(45) Date of Patent: Jun. 24, 2025

(54) DATA PROCESSING SYSTEM AND OPERATION METHOD OF DATA PROCESSING APPARATUS

(71) Applicant: Samsung Electronics Co., Ltd., Suwon-si (KR)

(72) Inventors: Jangsub Yi, Suwon-si (KR); Wonsuk Jung, Suwon-si (KR); Junwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 18/472,106

(22) Filed: Sep. 21, 2023

(65) Prior Publication Data

US 2024/0020035 A1    Jan. 18, 2024

Related U.S. Application Data

(63) Continuation of application No. PCT/KR2022/002086, filed on Feb. 11, 2022.

(30) Foreign Application Priority Data

Mar. 30, 2021    (KR) .................. 10-2021-0041259

(51) Int. Cl.
*G06F 13/10*    (2006.01)
*G06F 3/06*    (2006.01)

(52) U.S. Cl.
CPC ............ *G06F 3/0635* (2013.01); *G06F 3/061* (2013.01); *G06F 3/0679* (2013.01)

(58) Field of Classification Search
CPC ........ G06F 13/10; G06F 3/0635; G06F 3/061; G06F 3/0679
See application file for complete search history.

(56) References Cited

U.S. PATENT DOCUMENTS 6,275,346 B1 * 8/2001 Kim .................. G11B 20/10481
                                                              360/68
8,854,966 B2 * 10/2014 Fadell .................. H04L 47/803
                                                              370/235

(Continued)

FOREIGN PATENT DOCUMENTS

JP    2002244899 A    8/2002
JP    2013182404 A    9/2013

(Continued)

OTHER PUBLICATIONS

International Search Report for PCT/KR2022/002086 mailed May 30, 2022, 5 pages.

(Continued)

*Primary Examiner* — Cheng Yuan Tseng
(74) *Attorney, Agent, or Firm* — Nixon & Vanderhye, P.C.

(57) ABSTRACT

An example electronic device may include a storage device including a device interface and a non-volatile memory; an interface including a plurality of transmitting lanes and a plurality of receiving lanes and configured to communicate with the storage device; and at least one processor configured to control processing of data through the interface based on an input/output request generated by an application, wherein one or more of the at least one processor may process the data through a first group of lanes when the input/output request indicates data write; process the data through a second group of lanes, in which more lanes than the first group of lanes are enabled, when the input/output request indicates data read; and process the data through the second group of lanes when the amount of resources of the electronic device used while the data is processed through the first group of lanes exceeds a designated level.

20 Claims, 13 Drawing Sheets

(56) References Cited

U.S. PATENT DOCUMENTS

| | | | |
|---|---|---|---|
| 8,880,817 B2* | 11/2014 | Krishnan | G06F 3/0626 |
| | | | 710/110 |
| 8,904,077 B1 | 12/2014 | Alston | |
| 9,015,357 B2 | 4/2015 | Hunkins et al. | |
| 9,026,854 B2 | 5/2015 | Jeong et al. | |
| 9,236,674 B2* | 1/2016 | Rabinovitz | H01R 12/721 |
| 9,578,355 B2* | 2/2017 | Hardin | H04N 21/2385 |
| 9,740,653 B2 | 8/2017 | Wietfeldt | |
| 9,755,888 B2 | 9/2017 | Inoue et al. | |
| 9,871,732 B2* | 1/2018 | Lewin-Eytan | H04L 47/22 |
| 10,222,853 B2 | 3/2019 | Suh et al. | |
| 10,444,999 B2 | 10/2019 | Shin et al. | |
| 10,521,391 B1 | 12/2019 | Savoj et al. | |
| 10,630,554 B1* | 4/2020 | Mithal | H04L 41/5096 |
| 10,630,600 B2* | 4/2020 | Nipane | H04L 41/0894 |
| 10,769,079 B2 | 9/2020 | Boenapalli et al. | |
| 10,852,809 B2 | 12/2020 | Suh et al. | |
| 11,023,403 B2 | 6/2021 | Savoj et al. | |
| 11,263,160 B2 | 3/2022 | Sunwoo | |
| 2002/0112030 A1 | 8/2002 | Iwami et al. | |
| 2014/0244904 A1 | 8/2014 | Kondo et al. | |
| 2015/0113333 A1 | 4/2015 | Kim | |
| 2020/0241625 A1 | 7/2020 | Boenapalli et al. | |
| 2020/0341825 A1 | 10/2020 | Sudarmani et al. | |

FOREIGN PATENT DOCUMENTS

| | | |
|---|---|---|
| KR | 20150045258 A | 4/2015 |
| KR | 20170120470 A | 10/2017 |
| KR | 20190069880 A | 6/2019 |
| KR | 102146867 B1 | 8/2020 |

OTHER PUBLICATIONS

Written Opinion of the ISA for PCT/KR2022/002086 mailed May 30, 2022, 4 pages.

* cited by examiner

DATA PROCESSING SYSTEM AND OPERATION METHOD OF DATA PROCESSING APPARATUS

CROSS-REFERENCE TO RELATED APPLICATIONS

This application is a continuation of International Application No. PCT/KR2022/002086 designating the United States, filed on Feb. 11, 2022, in the Korean Intellectual Property Receiving Office and claiming priority to Korean Patent Application No. 10-2021-0041259, filed on Mar. 30, 2021, in the Korean Intellectual Property Office, the disclosures of all of which are incorporated by reference herein in their entireties.

BACKGROUND

Field

The disclosure relates to a data processing system and an operation method of a data processing apparatus.

Description of Related Art

With the development of digital technology, various electronic devices capable of communicating and processing personal information while moving, such as mobile communication terminals, electronic notebooks, smart phones, tablet PCs, and wearable devices, have been released. Such an electronic device may include a data processing system (e.g., a storage system) that controls storage of data.

A data processing system may include, for example, a host and a device, and the host and the device may be connected to each other through various interface standards for high-rate data transmission. For example, a host and a device may be connected to each other through an interface using UniPro, which supports a physical layer such as M-PHY, as a link layer. A lane (or link) may be formed between the host and the device interfacing using UniPro and M-PHY, and data may be transmitted and received through the lane.

SUMMARY

The above-described data processing system may activate (or form) multiple lanes (e.g., two or more transmission lanes and two or more reception lanes) to enable high-rate data processing. For example, the data processing system may determine whether the host and the device support multiple lanes based on a capability exchange operation, and activate the multi-lanes when it is determined that multi-lanes are supported.

However, as the number of active lanes between the host and the device increases, data processing performance may be improved and power consumption may also increase. Accordingly, unnecessary power consumption may occur as multiple lanes are maintained in a situation where high-rate data processing is not required.

Various example embodiments of the disclosure provide a method capable of dynamically adjusting the number of activated lanes according to an operating state of an electronic device and a data processing system supporting the same.

According to an example embodiment of the disclosure, an electronic device includes a storage device including a device interface and a non-volatile memory; an interface that supports a plurality of transmission lanes and a plurality of reception lanes and configured to communicate with the storage device; and at least one processor configured to control processing of data through the interface based on an input/output request generated by an application, wherein one or more of the at least one processor is configured to process the data through a first group of lanes when the input/output request indicates data input (writing), process the data through a second group of lanes in which a greater number of lanes than the first group of lanes are activated when the input/output request indicates data output (reading), and process the data through the second group of lanes when an amount of used resources of the electronic device exceeds a specified level in a state in which the data is processed through the first group of lanes.

According to an example embodiment of the disclosure, a method of operating an electronic device including an interface supporting a plurality of transmission lanes and a plurality of reception lanes includes identifying an input/output request generated by an application; processing data through a first group of lanes of the interface when a data input (writing) request is generated by the application; processing the data through a second group of lanes of the interface, in which a greater number of lanes than the first group of lanes are activated, when a data output (reading) request is generated by the application; and processing the data through the second group of lanes when an amount of used resources of the electronic device exceeds a specified level in a state in which the data is processed through the first group of lanes.

According to an example embodiment of the disclosure, a data processing system includes a host including a first interface supporting a plurality of lanes and an application; and a device including a second interface supporting a plurality of lanes, wherein the host is configured to determine a first group of lanes as an activation target and notify the device of the activation target lane when an input/output request indicating data input (writing) is generated by the application, determine a second group of lanes as an activation target and notify the device of the activation target lane when an input/output request indicating data output (reading) is generated by the application, and determine the second group of lanes as the activation target and notify the device of the second group of lanes when an amount of used resources of the host exceeds a specified level in a state in which the second group of lanes is determined as the activation target, and wherein the device activates a lane corresponding to the activation target in response to a notification from the host.

According to various example embodiments of the disclosure, a data storage system may prevent unnecessary power consumption due to use of multiple lanes by dynamically adjusting the number of activated lanes according to an operating state of an electronic device.

Effects obtained by various example embodiments of the disclosure may not be limited to the above.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar elements may be marked by the same or similar reference numerals.

DETAILED DESCRIPTION

Figure 1:
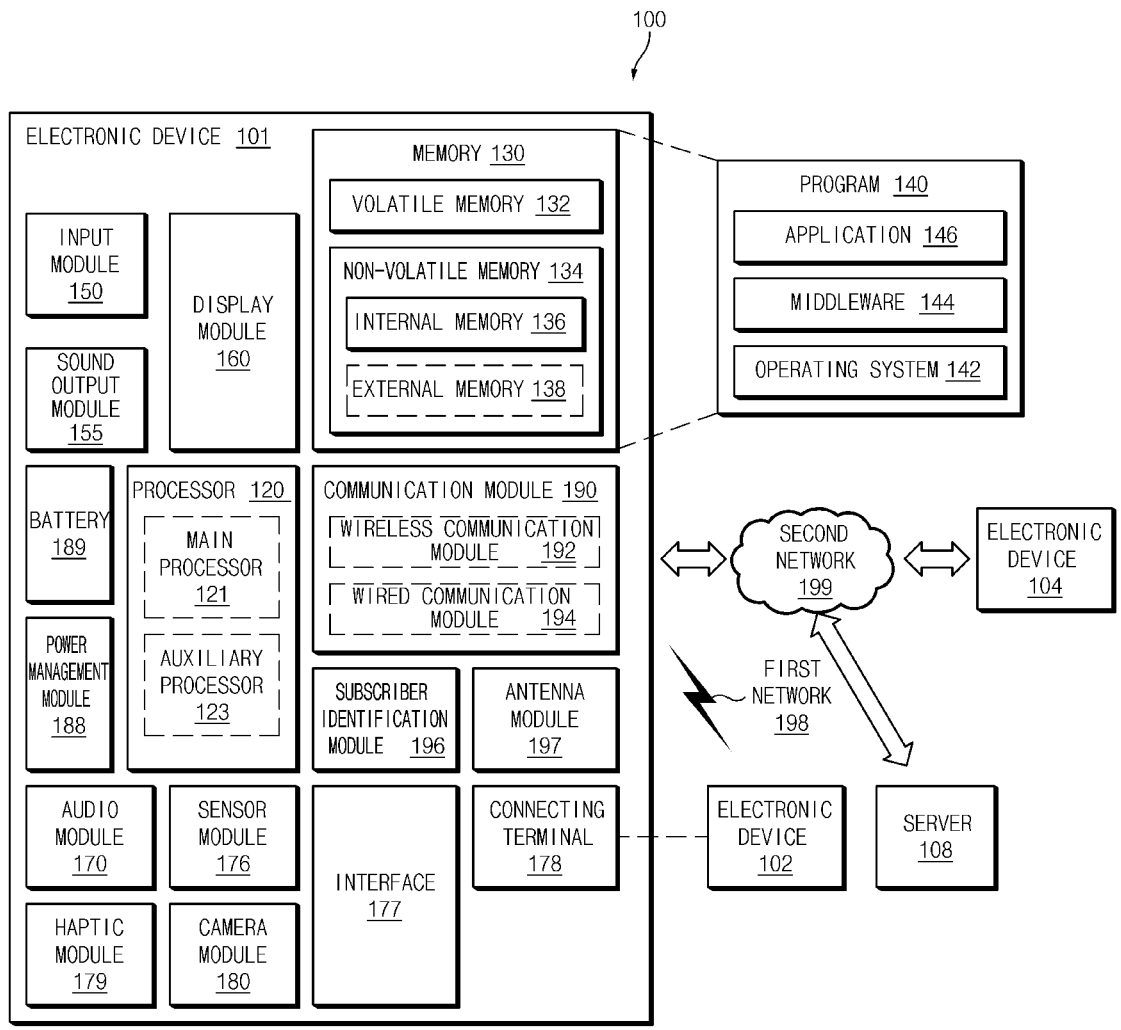
FIG. 1 is a block diagram illustrating an example electronic device in a network environment according to various embodiments.

Various embodiments of the disclosure may be described with reference to accompanying drawings. Accordingly, those of ordinary skill in the art will recognize that modifications, equivalents, and/or alternatives of the various embodiments described herein can be variously made without departing from the scope and spirit of the disclosure. With regard to description of drawings, similar elements may be marked by similar reference numerals.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and are intended to include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of phrases such as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, terms such as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. As used herein, including the claims, the term "processor" may include various processing circuitry, including at least one processor, wherein one or more processors of the at least one processor may be configured to perform the various functions described herein. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
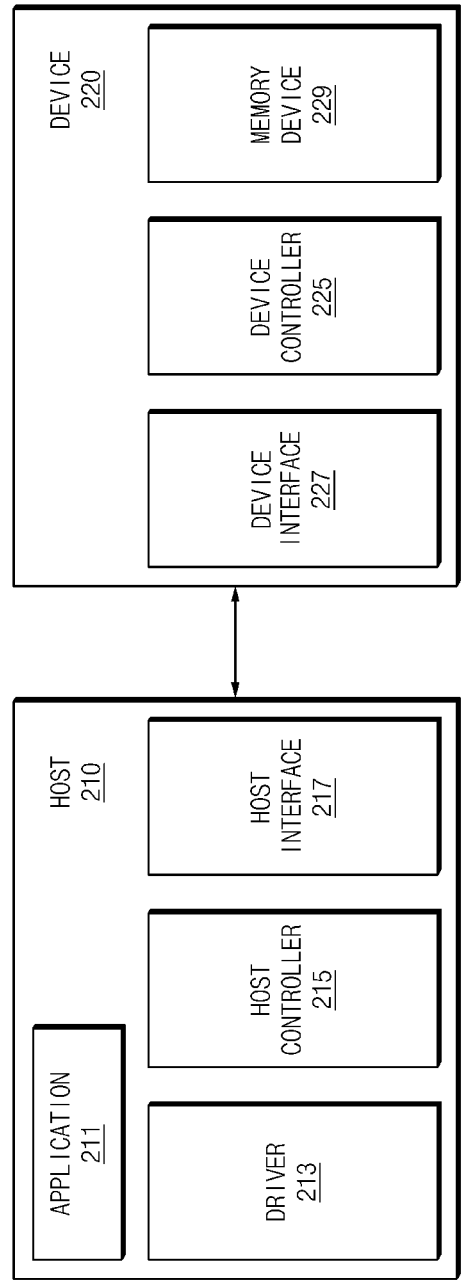
FIG. 2A is a block diagram schematically illustrating a configuration of an example data processing system according to various embodiments.
Figure 2B:
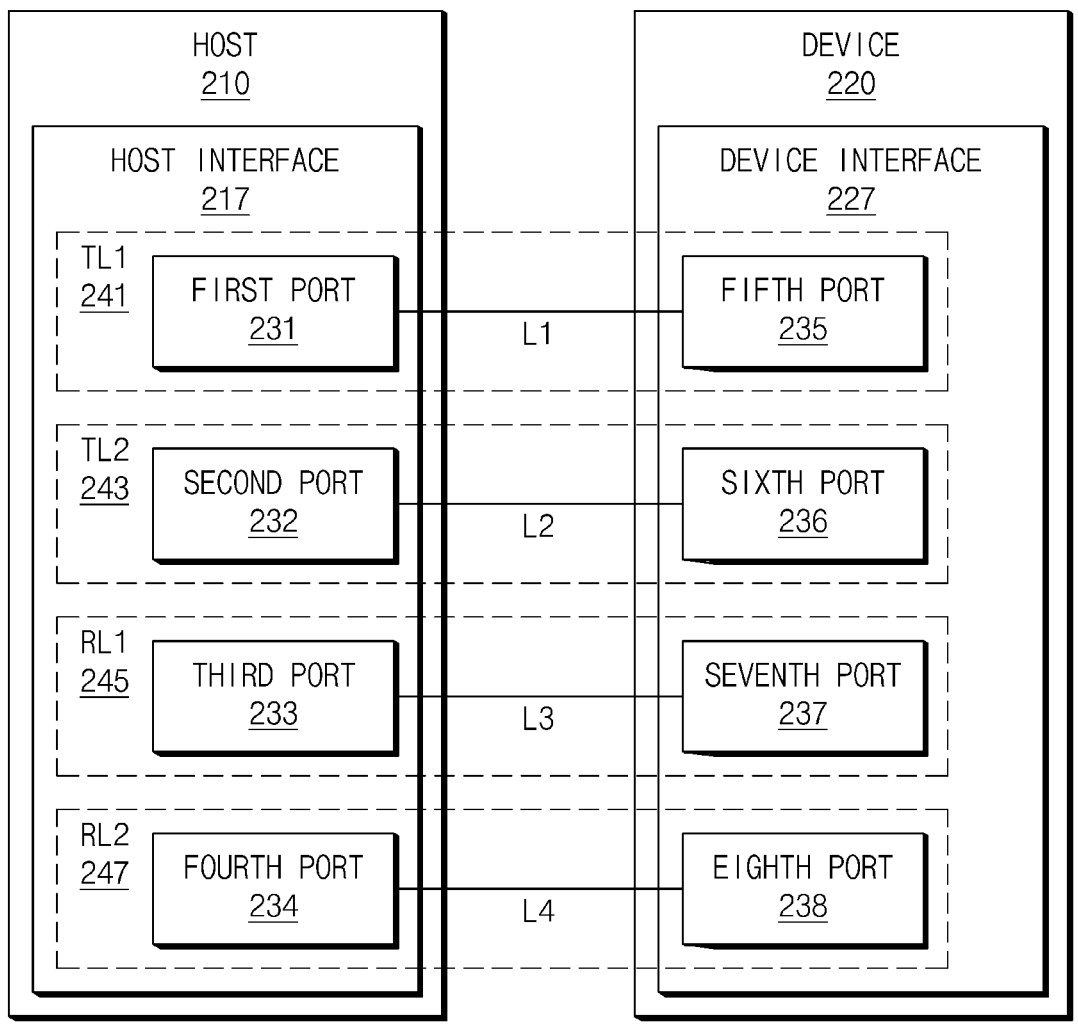
FIG. 2B is a block diagram illustrating lanes of an example data processing system according to various embodiments.
Figure 2C:
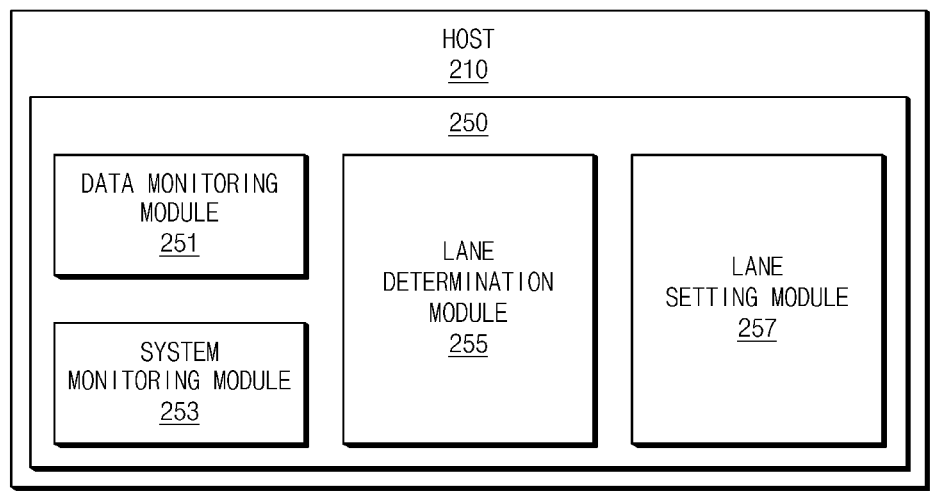
FIG. 2C is a block diagram schematically illustrating a configuration of an example lane setting unit according to various embodiments.

FIG. 2A is a block diagram schematically illustrating a configuration of an example data processing system according to various embodiments. FIG. 2B is a block diagram illustrating lanes of an example data processing system according to various embodiments. FIG. 2C is a block diagram schematically illustrating a configuration of an example lane setting unit according to various embodiments.

Referring to FIG. 2A, a data processing system 200 according to various embodiments may include a host 210 and a device 220.

According to various embodiments, the host 210 may input (e.g., write) data to the device 220 or output (e.g., read) data from the device 220. According to an embodiment, the host 210 and the device 220 may communicate through a specified interface protocol. For example, the specified interface may include the M-PHY standard used as a universal flash storage (UFS) standard. For example, the host 210 may correspond to the processor 120 and may include an application processor (AP) chip. The device 220 may correspond to the memory 134 and may include a UFS storage device. However, this is only illustrative, and embodiments are not limited thereto. According to an embodiment, the device 220 may include various types of modules supporting the M-PHY standard, such as an RF module (e.g., the communication module 190) and a camera module (e.g., the camera module 180) in addition to the memory 134.

According to various embodiments, the host 210 may include an application 211 (e.g., the application 146), a driver 213, a host controller 215 (e.g., the processor 120), and a host interface 217 (e.g., the interface 177). According to an embodiment, the application 211 and the driver 213, which are program modules (e.g., the program 140) executed by the host controller 215, may be stored (or loaded) in a memory (e.g., the memory 132). According to an embodiment, the host controller 215 (e.g., the processor 120) and the host interface 217, which are units implemented as hardware, may be provided as a configuration of a processor (e.g., the processor 120).

The application 211 may refer, for example, to a program (or software) that communicates with the device 220. The application 211 may communicate with the device 220 using the driver 213.

According to an embodiment, the application 211 may transmit a data input/output request (or a command) to the driver 213 in order to process data. For example, the input/output request may include a writing request indicating data input to the device 220, a reading request indicating data output from the data 220, and/or a deleting request instructing deletion of data stored in the device 220. However, the disclosure is not limited in this respect.

The driver 213, which may, for example, be a program executable in an operating system, may control the host controller 215.

According to an embodiment, the driver 213 may enable the application 211 to provide functions related to data input (e.g., data writing) and/or data output (e.g., data reading). For example, the driver 213 may use a driver program to output a data input/output request transmitted by the application 211 to the host controller 215 according to a predetermined procedure (e.g., UFS standard). In this regard, the driver 213 may perform an operation of converting a data input/output request into a predetermined form.

The host controller 215 may control overall internal operations of the host 210.

According to an embodiment, when receiving a data writing request from the driver 213, the host controller 215 may provide data to the device 220 through the host interface 217. In addition, when receiving a data reading request from the driver 213, the host controller 215 may provide the reading request to the device 220 through the host interface 217 and receive data from the device 220.

The host interface 217 may establish communication between the host 210 and the device 220. For example, the host interface 217 may include MIPI UniPro and MIPI M-PHY.

According to various embodiments, the device 220 may include a device controller 225, a device interface 227, and at least one memory device 229.

The device controller 225 may control the device interface 227 and the at least one memory device 229. According to an embodiment, the device controller 225 may communicate with the host controller 215, and may input (e.g., write) data to the at least one memory device 229 in response to a request from the host 210 or perform a process of outputting (e.g., reading) data of the at least one memory device 229.

The at least one memory device 229 may include a memory cell array and a control circuit for controlling an operation of the memory cell array. According to an embodiment, the memory cell array may include a 2D memory cell array or a 3D memory cell array. For example, the at least one memory device 229 may include a plurality of memory cells for storing data.

The device interface 227 may establish communication between the device 220 and the host 210. For example, the device interface 227 may include MIPI UniPro and MIPI M-PHY.

According to various embodiments, a lane may be formed between the host interface 217 and the device interface 227. A lane may refer, for example, to a data transmission path.

For example, as shown in FIG. 2B, the host interface 217 may include a first port 231, a second port 232, a third port 233, and a fourth port 234. The first port 231 and the second port 232 may be transmission ports used to transmit data from the host 210 to the device 220, and the third port 233 and the fourth port 234 may be reception ports used to receive data transmitted from the device 220. However, this is only illustrative, and the example embodiments are not limited thereto. For example, more or fewer ports than the illustrated first to fourth ports 231 to 234 may be provided as components of the host interface 217. Similarly, the device 220 may include the device interface 227 including a fifth port 235, a sixth port 236, a seventh port 237, and an eighth port 238. The fifth port 235 and the sixth port 236 may be reception ports used to receive data transmitted from the host 210, and the seventh port 237 and the eighth port 238 may be transmission ports used to transmit data from the device 220 to the host 210. However, this is only illustrative, and the example embodiments are not limited thereto. For example, more or fewer ports than the illustrated fifth to eighth ports 235 to 238 may be provided as components of the device interface 227.

For example, the transmission ports (e.g., the first port and the second port 232) of the host interface 217 and the reception ports (e.g., the fifth port 235 and the sixth port 236) of the device interface 227 may be connected to each other through lines by lines L1 and L2, and the receive ports (e.g., the third ports 233 and the fourth ports 234) of the host interface 217 and the transmit ports (e.g., the seventh port 237 and the eighth port 238) of the device interface 227 may be connected to each other through lines L3 and L4.

For example, a first transmission lane TL1 241 may be formed by connecting the first port 231 and the fifth port 235, and a second transmission lane TR2 243 may be formed by connecting the second port 232 and the sixth port 236. In addition, a first reception lane RL1 245 may be formed by connecting the third port 233 and the seventh port 237, and a second reception lane RL2 247 may be formed by connecting the fourth port 234 and the eighth port 238. Additionally, when a larger number of ports than the first to fourth ports 231 to 234 are provided as components of the host interface 217, and a larger number than the fifth to eighth ports 235 to 238 are provided as components of the device interface 227, a larger number of lanes may be formed than the illustrated lanes.

According to various embodiments, as shown in FIG. 2C, the host 210 may include a lane setting unit 250 that dynamically adjusts the number of activated lanes. According to an embodiment, the lane setting unit 250 may check the operating state of the electronic device 101, and in a situation in which low-rate data processing is required, the lane setting unit 250 may form a first group of lanes (or default lanes) (e.g., the first transmission lane 241 and the first reception lane 245), and in a situation in which high-rate data processing is possible, may form a second group of lanes (or extended lanes) (e.g., at least three lanes of the first transmission lane 241, the second transmission lane 243, the first reception lane 245 or the second reception lane 247). Accordingly, it is possible to reduce power consumption while keeping high-rate data processing between the host 210 and the device 220.

Referring to FIG. 2C, the lane setting unit 250 may include a data monitoring module 251, a system monitoring module 253, a lane determination module 255, and/or a lane setting module 257.

According to various embodiments, the data monitoring module 251 may monitor data requested by the application 211.

According to an embodiment, the data monitoring module 251 may monitor the requested data processing scheme and the amount of processed data based on the data input/output request transmitted to the driver 213 by the application 211. The data processing scheme may include data reading, data writing, or data deleting, but the example embodiments are not limited thereto.

According to various embodiments, the system monitoring module 253 may monitor resources of the electronic device 101 used by the application 211. Resources of the electronic device 101 may, for example, include all of hardware resources and software resources.

According to an embodiment, the system monitoring module 253 may monitor resource usage information (e.g., a type of resource or an amount of resource). For example, the processor 120 usage information such as clock information and core information of the processor 120 may be collected as at least a part of the monitoring result. As another example, the system monitoring module 253 may monitor a data transmission rate (e.g., a gear level) set between the host 210 and the device 220, and a file system (e.g., a sysfs node) in which information related to the device 220 is recorded. However, this is only illustrative, and the example embodiments are not limited thereto. For example, usage information of various resources of the electronic device 101, such as the sensor module 176, the communication module 190, and the camera module 180, may be monitored.

According to various embodiments, the lane determination module 255 may determine a lane operation scheme based on at least a part of monitoring results of the data monitoring module 251 and the system monitoring module 253. The lane operation scheme may include, for example, a first group lane operation scheme related to a situation in which low-rate data processing is required and a second group lane operation scheme related to a situation in which high-rate data processing is required. For example, the first group lane operation scheme may be a scheme of activating and operating one transmission lane and one reception lane. The second group lane operation scheme may be operated by increasing at least one of the number of transmission lanes or the number of reception lanes compared to the lanes activated by the first group lane operation scheme.

According to an embodiment, the lane determination module 255 may determine a lane operation scheme based on at least one of a data processing scheme, a processing amount of data, or whether data is continuously processed.

For example, there may be a difference between data processing performance required for an operation (e.g., writing operation) of the device 220 corresponding to a data input request (e.g., writing request) of the host 210 and data processing performance required for an operation (e.g., a reading operation) of the device 220 corresponding to a data output request (e.g., a read request) of the host 210. For example, more data processing performance (e.g., 1.8 GB/s) may be required for a reading operation of the device 220 than data processing performance (e.g., 1 GB/s) of the device 220 required for a writing operation.

In this regard, the lane determination module 255 may identify the data processing scheme based on the data input/output request transmitted to the application 211 and use it to determine a lane operation scheme. For example, when an input request indicating data input (e.g., writing) is monitored, the lane determination module 255 may determine to operate the first group of lanes that can cover the required data processing performance (e.g., 1 GB/s) in the writing operation. For example, when an input request indicating data input (e.g., writing) is monitored, the lane determination module 255 may determine that an operation of one transmission lane and/or one reception lane capable of supporting performance of 1.46 GB/s is required In addition, when an output request indicating data output (e.g., reading) is monitored, the lane determination module 255 may determine to operate the second group of lanes that can cover the required performance (e.g., 1.8 GB/s) in the reading operation. For example, at least one of the transmission lane or the reception lane may support data processing performance of 2.92 GB/s according to the second group lane operation scheme.

As another example, there may be a difference in data processing performance required of the device 220 depending on the amount of data processing by the host 210 and/or whether data is continuously processed.

In this regard, when detecting a request to process data that does not exceed a predetermined reference amount (e.g., a request to process low-volume data) or a request to process non-continuous data, the lane determination module 255 may determine to operate the first group of lanes.

In addition, when detecting a request to process data that exceeds the predetermined reference amount (e.g., a request to process high-volume data) or a request to process continuous data, the lane determination module 255 may determine to operate the second group of lanes.

According to an embodiment, the lane determination module 255 may determine a lane operation scheme based on resource usage information.

For example, the electronic device 101 may use a first level resource or a second level resource according to an execution situation of the application 211. For example, the first level resource may be a smaller amount of resource usage than the second level resource, and the electronic device 101 may use the first level resource to reduce power consumption in a first execution situation (e.g., while a single application is executed), and use the second level resource to boost the performance of the electronic device 101 in the second execution situation (e.g., while multiple applications are executed).

In this regard, the lane determination module 255 may determine to operate the first group of lanes when detecting the use of the first level resource. In addition, when detecting the use of the second level resource, the lane determination module 255 may determine to operate the second group of lanes within a range in which data processing is possible with the currently used resource.

According to an embodiment, the lane determination module 255 may determine a lane operation scheme based on the operation mode of the device 220. For example, the device 220 may dynamically determine an operation mode according to the size of data to be processed or required performance. The operation mode of the device 220 may include a first mode and a second mode. For example, the first mode may include a boosting mode in which data is input to a first area (e.g., an SLC block) in the at least one memory device 229 and moved to a second area (e.g., a TLC block) supporting a lower speed than the first area. In addition, the second mode may include a normal mode in which data is directly input to the second area without passing through the first area in the at least one memory device 229.

In this regard, the lane determination module 255 may determine to operate the second group of lanes when the device 220 operates in the first operation mode (e.g., a boosting mode). In addition, when the device 220 operates in the second operation mode (e.g., a normal mode), the lane determination module 255 may determine to operate the second group of lanes within a range in which data can be processed with currently used resources.

According to an embodiment, the lane determination module 255 may determine a lane operation scheme based on a lane change request provided by the application 211. In this regard, the application 211 may call a file system (e.g., a sysfs node) in which information related to the device 220 is recorded, and may identify information on lanes operable between the host 210 and the device 220 and/or information on a currently operating lane between the host 210 and the device 220. Accordingly, when the application 211 detects a situation in which high-rate data transmission is required (e.g., high-resolution shooting mode execution, high-speed shooting mode execution, continuous shooting mode execution, or the like) and determine that it is possible to operate the second group of lanes between the host 210 and the device 220, the application 211 may request the lane determination module 255 to operate the second group of lanes. In addition, when the application 211 detects a situation in which low-rate data transmission is required (e.g., low-resolution shooting mode execution, or the like) or determine that it is possible to operate the first group of lanes between the host 210 and the device 220, the application 211 may request the lane determination module 255 to operate the first group of lanes.

According to an embodiment, the lane determination module 255 may determine a lane operation scheme based on the transmission mode determined by the driver 213. The transmission mode may refer, for example, to a data transmission rate (e.g., gear level) set between the host 210 and the device 220. For example, the driver 213 may adjust the transmission rate (or performance) of the physical layer of the host interface 217, such as the M-PHY, in stages as shown in Table 1 below.

TABLE 1

| HS-Gear | Rate (MB/s) |
| --- | --- |
| HS-Gear 1 | 182 |
| HS-Gear 2 | 364 |
| HS-Gear 3 | 728 |
| HS-Gear 4 | 1457 |

In this regard, in a situation in which the physical layer of the host interface 217 is determined to support a low data transmission rate (e.g., Gear level 2 or lower), the driver 213 may request the lane determination module 255 to operate the first group of lanes. In a situation in which the physical layer of the host interface 217 is determined to support a high data transmission rate (e.g., Gear level 3 or higher), the driver 213 may request the lane determination module 255 to operate the second group of lanes.

According to an embodiment, the lane determination module 255 may determine a lane operation scheme based on a combination of the above-described monitoring result of the data monitoring module 251 and the monitoring result of the system monitoring module 253.

For example, when an input/output request indicating data input (e.g., writing) is monitored, the lane determination module 255 may determine to operate the first group of lanes that can support the required performance (e.g., 1 GB/s) in a writing operation.

In this regard, the lane determination module 255 may change an activated lane based on a monitoring result of the system monitoring module 253 in a situation in which the first group of lanes is operated (or determined). For example, in a state in which the first group of lanes is operated (or determined), the lane determination module 255 may maintain operation of the first group of lanes when the situation in which resources of the first level are used is monitored, and change to the operation scheme of the second group of lanes when the situation in which the resources of the second level are used is monitored.

As another example, when an input/output request indicating data output (e.g., reading) is monitored, the lane determination module 255 may determine to operate the second group of lanes that can support the required performance (e.g., 1.8 GB/s) in a reading operation.

In this regard, the lane determination module 255 may change an activated lane based on a monitoring result of the system monitoring module 253 in a situation in which the second group of lanes is operated (or determined). For example, in a state in which the second group of lanes is operated (or determined), the lane determination module 255 may maintain operation of the second group of lanes when the situation in which resources of the second level are used is monitored, and change to the operation scheme of the first group of lanes when the situation in which the resources of the first level are used is monitored.

However, this is only illustrative, and the example embodiments are not limited thereto. For example, a combination of at least two of the monitoring result of the data monitoring module 251, the monitoring result of the system monitoring module 253, the lane change request provided by the application 211, or the transmission mode determined by the driver 213 may be used for lane change determination.

For example, as shown in Table 2 below, the lane determination module 255 according to various embodiments may define user conditions and determine the lane operation corresponding to each condition using a combination of at least two of the monitoring result of the data monitoring module 251, the monitoring result of the system monitoring module 253, the lane change request provided by the application 211, or the transmission mode determined by the driver 213.

TABLE 2

| User case | Lane operation scheme |
| --- | --- |
| First situation (Reading/Writing low-rate operation) | Single transmission lane + single reception lane |
| Second situation (Writing high-rate operation) | Single transmission lane + multiple reception lanes |
| Third situation (Reading high-rate operation) | Multiple transmission lanes + single reception lane |
| Fourth situation (Reading/Writing high-rate operation) | Multiple transmission lanes + multiple reception lanes |

For example, the first situation may include at least one of a situation in which the electronic device 101 is not used and left unattended by a user, a situation in which an application (e.g., a calculator, a calendar, contacts, and the like) or a function (e.g., a menu search function) that does not generate input data or generates input data below a certain level is executed, a situation in which a moving image requiring low-rate data processing is executed, or a situation in which a still image is captured. In this regard, the lane determination module 255 may determine a scheme of operating a single transmission lane (e.g., one transmission lane) and a single reception lane (e.g., one reception lane) when a condition of the electronic device 101 corresponding to the first situation is detected.

As another example, the second situation may include at least one of a situation in which data stored in an external device (e.g., a computer) supporting a certain level of performance is moved (or copied) to an electronic device, a situation in which data is downloaded using an Internet function, or a situation in which a photographing function requiring high-rate data is executed. In this regard, when the condition of the electronic device 101 corresponding to the second situation is detected, the lane determination module 255 may determine a scheme of operating a single transmission lane (e.g., one transmission lane) and multiple reception lanes (e.g., two or more transmission lanes).

As still another example, the third situation may include at least one of a situation in which an application (e.g., a game) requiring relatively high performance is executed, a situation in which data stored in an electronic device is moved to an external device (e.g., a computer) that supports a certain level of performance, or a situation in which data is uploaded using an Internet function. In this regard, when the condition of the electronic device 101 corresponding to the third condition is detected, the lane determination module 255 may determine a scheme of operating multiple transmission lanes (e.g., two or more transmission lanes) and a single reception lane (e.g., one transmission lane).

As still another example, the fourth situation may include at least one of a situation in which data is moved (or copied) from an electronic device to an external device (e.g., a smart phone) that supports performance below a certain level, a situation in which another application (e.g., a game) is executed while downloading (or installing) data from an external server, or a situation in which another application is executed while transmitting data to an external server. In this regard, when a situation of the electronic device 101 corresponding to the fourth situation is detected, the lane determination module 255 may determine a scheme of operating multi-transmission lanes (e.g., two or more transmission lanes) and multi-reception lanes (e.g., two or more transmission lanes).

According to various embodiments, the lane setting module 257 may set a lane based on a determination of the lane determination module 255. According to an embodiment, the lane setting module 257 may operate one transmission lane and one reception lane when operation of the first group of lanes is required. According to an embodiment, the lane setting module 257 may activate two or more of at least one of a transmission lane or a reception lane when operation of the lanes of the second group is required. In this regard, the lane setting module 257 may select a port to be activated among ports (e.g., the first to fourth ports 231 to 234) of the host interface 217, and provide information related to the selected port to the device 220 to form a lane between the host 210 and the device 220.

According to various embodiments, at least one module among components of the lane setting unit 250 described above may be excluded from the lane setting unit 250, or, conversely, a module other than the above-described module(s) may be added as a component of the lane setting unit 250. In addition, among the aforementioned modules, some modules (e.g., the lane determination module 255) may be integrated with other modules (e.g., the lane setting module 257).

According to various embodiments, the configuration of the aforementioned lane setting unit 250 may be a separate configuration different from the configuration of the host 210 described with reference to FIG. 2A, but at least some components of the lane setting unit 250 may be integrated into at least one of the components of the host 210 described with reference to FIG. 2A. For example, at least some components of the lane setting unit 250 may be integrated into the driver 213 of the host 210, and at least some other components may be integrated into the host controller 215.

According to various example embodiments, an electronic device (e.g., the electronic device 101) may include a storage device (e.g., the device 220) including a device interface (e.g., the device interface 227) and a non-volatile memory (e.g., the memory device 229), an interface (e.g., the host interface 217) configured to support a plurality of transmission lanes and a plurality of reception lanes and communicate with the storage device, and at least one processor (e.g., the processor 120) configured to control processing of data through the interface based on an input/output request generated by an application (e.g., the application 211), where one or more of the at least one processor may be configured to process the data through a first group of lanes when the input/output request indicates data input (writing), process the data through a second group of lanes in which a greater number of lanes than the first group of lanes is activated when the input/output request indicates data output (reading), and process the data through the second group of lanes when an amount of used resources of the electronic device exceeds a specified level in a state in which the data is processed through the first group of lanes.

According to various example embodiments, one or more of the at least one processor may be configured to process the data through the first group of lanes when the amount of used resources of the electronic device does not exceed the specified degree in a state in which the data is processed through the second group of lanes.

According to various example embodiments, one or more of the at least one processor may be configured to change a lane for processing the data based on a lane change request when the lane change request is generated by the application in a state in which the data is processed through the first group of lanes or the second group of lanes. For example, the lane change request may include a lane increase request for high-rate data transmission-based service execution and a lane decrease request for low-rate data transmission-based service execution.

According to various example embodiments, one or more of the at least one processor may be configured to change a lane for processing the data based on a changed data transmission mode when a data transmission mode is changed in a state in which the data is processed through the first group of lanes or the second group of lanes. For example, the data transmission mode may include a mode supporting a high data transmission rate and a mode supporting a low data transmission rate.

According to various example embodiments, one or more of the at least one processor may be configured to ignore processing of an input/output request additionally generated by the application while processing the data through the first group of lanes or the second group of lanes.

According to various example embodiments, one or more of the at least one processor may be configured to restrict the electronic device from entering a low power mode while processing the data through the first group of lanes or the second group of lanes, and complete processing of the input/output request.

According to various example embodiments, at least some lanes of the first group of lanes may be included in the second group of lanes.

According to various example embodiments, the storage device may include a universal flash storage device.

According to various example embodiments, a host (e.g., the host 210 and the processor 120) of an electronic device (e.g., the electronic device 101) may include a host interface (e.g., the host interface 217) including a plurality of transmission lanes and a plurality of reception lanes and configured to communicate with a storage device (e.g., the device 220 and the memory 134), and a host controller (e.g., the host controller 215) configured to control processing of data through the host interface based on an input/output request generated by an application (e.g., the application 211) and an amount of used resources of the electronic device. According to an example embodiment, the host controller may process data through the first group of lanes when the input/output request indicates data input (writing), process the data through a second group of lanes in which a greater number of lanes than the first group of lanes is activated when the input/output request indicates data output (reading), and process the data through the second group of lanes when an amount of used resources of the electronic device exceeds a specified level in a state in which the data is processed through the first group of lanes.

According to various example embodiments, a data processing system (e.g., the data processing system 200) may include a host (e.g., the host 210) including a first interface (e.g., the host interface 217) supporting a plurality of lanes and an application (e.g., the application 211), and a device (e.g., the device 220) including a second interface (e.g., the device interface 227) supporting a plurality of lanes.

According to various example embodiments, the host may be configured to determine, as an activation target, a first group of lanes and notify the device of the activation target of the first group of lanes when an input/output request indicating data input (writing) is generated by the application, determine, as the activation target, a second group of lanes and notify the device of the activation target of the second group of lanes when an input/output request indicating data output (reading) is generated by the application, and determine, as the activation target, the second group of lanes and notify the device of the activation target of the second group of lanes when an amount of used resources of the host exceeds a specified level in a state in which the second group of lanes is determined as the activation target.

According to various example embodiments, the device may be configured to activate a lane corresponding to the activation target in response to a notification from the host.

According to various example embodiments, the number of lanes of the first group may be less than a number of lanes of the second group.

According to various example embodiments, the device may include a universal flash storage device.

According to various example embodiments, the host may be configured to change an activated lane in response to a lane change request and notify the device when the lane change request is generated by the application in a state in which the first group of lanes is determined as the activation target.

According to various example embodiments, the data processing system may further include a driver configured to control a data transmission mode, where the host is configured to change an activated lane based on a changed data transmission mode and notify the device when the data transmission mode is changed by the driver in a state in which the first group of lanes is determined as the activation target.

Figure 3:
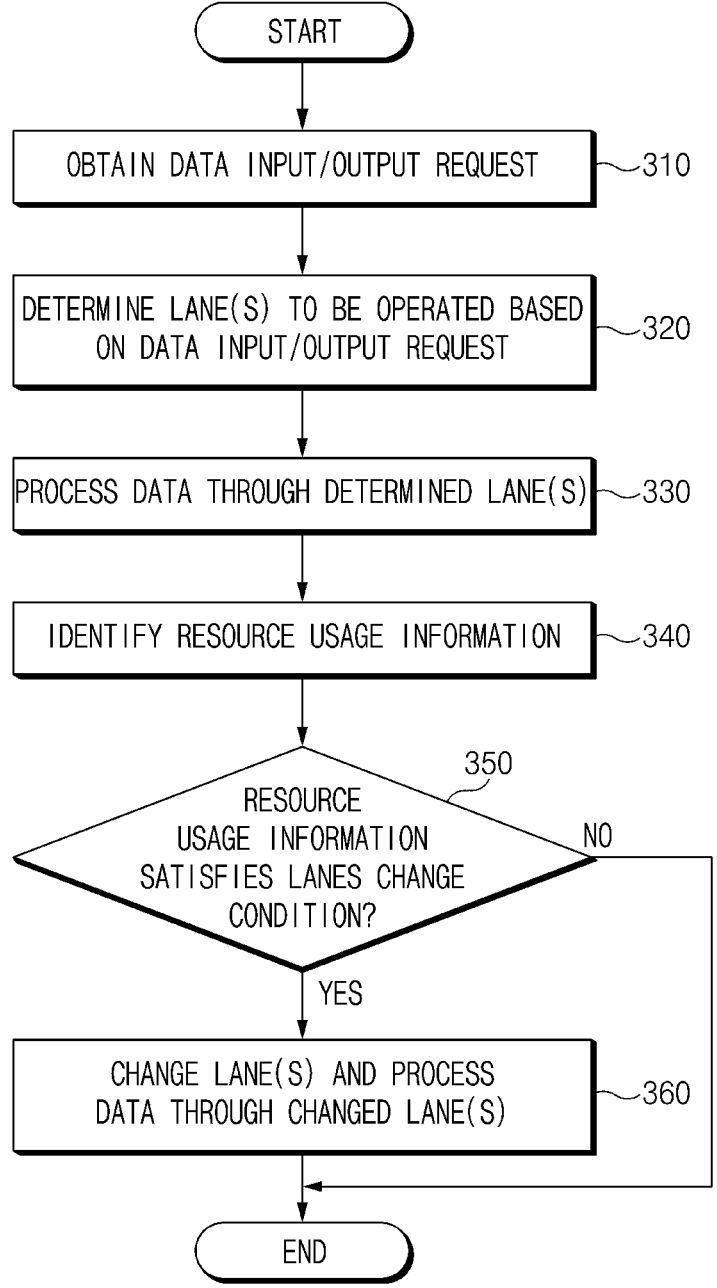
FIG. 3 is a flowchart illustrating an example operation of forming a lane in an example data electronic device according to various embodiments.

FIG. 3 is a flowchart illustrating an example operation of forming a lane in an example data electronic device according to various embodiments of the disclosure. In the following example embodiment, each operation may be performed sequentially, but is not necessarily performed sequentially. For example, the order of each operation may be changed, and/or at least two operations may be performed in parallel.

Referring to FIG. 3, in operation 310, the electronic device 101 (or the processor 120) according to various embodiments may obtain a data input/output request. The data input/output request may include, for example, an input request indicating data input (e.g., writing) to the device 220 or an output request indicating data output (e.g., reading) from the device 220. According to an embodiment, the electronic device 101 may identify a data input/output request provided to the driver 213 by the application 211.

According to various embodiments, in operation 320, the electronic device 101 (or the processor 120) may determine an operation lane based on the data input/output request. According to an embodiment, the electronic device 101 may determine, as an operation lane, a minimum number of lanes capable of supporting data processing performance required for an operation of the device 220 corresponding to a data input/output request.

For example, when an input/output request indicating data input (e.g., writing) is monitored, the electronic device 101 may determine to operate the first group of lanes capable of supporting performance (e.g., 1 GB/s) required for a writing operation. For example, the electronic device 101 may determine, as operation lanes, one transmission lane (e.g., the first transmission lane 241 or the second transmission lane 243) and one reception lane (e.g., the first reception lane 245 or the second reception lane 247).

In addition, when an input/output request indicating data output (e.g., reading) is monitored, the electronic device 101 may determine to operate the second group of lanes capable of supporting the required performance (e.g., 1.8 GB/s) in a reading operation. For example, the electronic device 101 may determine at least three lanes among the first transmission lane 241, the second transmission lane 243, the first reception lane 245, and the second reception lane 247 as operation lanes.

According to various embodiments, in operation 330, the electronic device 101 (or the processor 120) may process data through the determined lane(s). According to an embodiment, the electronic device 101 may provide information about the determined operation lane(s) to the device 220. For example, the electronic device 101 may select an activation target port from ports (e.g., the first to fourth ports 231 to 234) of the host interface 217, and provide information about the selected target port to the device 220 to form a lane between the host 210 and the device 220.

According to various embodiments, in operation 340, the electronic device 101 (or the processor 120) may identify resource usage information of the electronic device 101 in a state where a lane(s) is formed. The resource usage information may, for example, include an amount of used resources and a type of resource being used. According to an embodiment, the electronic device 101 may identify processor usage information such as clock information and core information of the processor 120. However, this is only illustrative, and the electronic device 101 may identify usage information on various resources of the electronic device 101 such as the sensor module 176, the communication module 190, and the camera module 180.

According to various embodiments, in operation 350, the electronic device 101 (or the processor 120) may determine whether the resource usage information satisfies a lane change condition. According to an embodiment, the lane change condition may include a first condition set to change the lanes of the first group in operation to lanes of the second group and a second condition set to change the lanes of the second group in operation to lanes of the first group. The first condition may be a situation in which resource usage information of a second level is obtained in a situation in which the first group of lanes is operated, and the second condition may be a situation in which resource usage information of a first level lower than the second level is obtained in a situation in which the second group of lanes is operated.

According to various embodiments, when the lane change condition is not satisfied, the electronic device 101 (or the processor 120) may process data by maintaining the currently operating lane(s).

According to various embodiments, when a lane change condition is satisfied, in operation 360, the electronic device 101 (or the processor 120) may change a lane(s) and process data through the changed lane(s).

According to an embodiment, the electronic device 101 may decrease or increase the number of currently operating lanes through lane change.

For example, when the resource usage information satisfies the lane change condition in a situation in which the first group of lanes (e.g., the first transmission lane 241 and the first reception lane 245) is operated, the electronic device 101 may additionally operate at least one of the second transmission lane 243 or the second reception lane 247.

As another example, when the resource usage information satisfies the lane change condition in a situation in which the second group of lanes (e.g., the first transmission lane 241, the second transmission lane 243, the first reception lane 245, and the second reception lane 247) is operated, the electronic device 101 may stop operation of at least one of the second transmission lane 243 or the second reception lane 247.

According to various embodiments, at least one of operations 310 to 360 described above may be omitted depending on the embodiment.

According to an embodiment, an embodiment in which an operation lane is determined based on a data input/output request and resource usage information may be included, and in this case, operation 330 may be omitted.

For example, in a situation where high-rate data output (e.g., reading) is required (e.g., a situation in which a high-end game is played, or a situation in which data inside the electronic device 101 is moved to an outside), the electronic device 101 may operate the first reception lane, the second reception lane, and the first transmission lane.

As another example, in a situation where high-rate data input (e.g., writing) is required (e.g., a situation in which external data is moved to an inside of the electronic device, or a situation in which a high-resolution shooting mode is executed), the electronic device 101 may operate the first reception lane, the first transmission lane and the second transmission lane. However, this is only illustrative, and the example embodiments are not limited thereto. For example, the electronic device 101 may dynamically operate lanes in various schemes based on an operating state of the electronic device 101.

According to various embodiments, at least one other operation may be added in addition to operations 310 to 360 described above.

According to an embodiment, as illustrated in the example of <Table 2> described above, an embodiment in which an operation lane is determined based on a combination of at least two of a data input/output request, resource usage information, a lane change request provided by the application 211, or a transmission mode determined by the driver 213 may be included. In this case, the lane change request provided by the application 211 and/or the operation of identifying the transmission mode determined by the driver 213 may be added.

Figure 4:
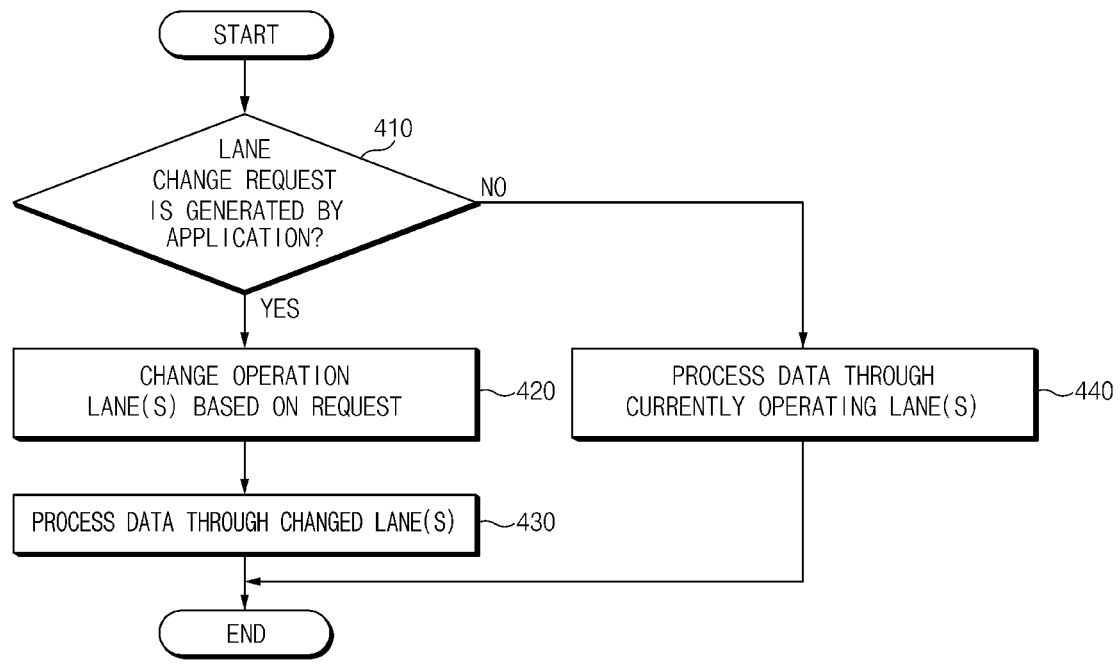
FIG. 4 is a flowchart illustrating an example operation of changing a lane setting in an example electronic device according to various embodiments.

FIG. 4 is a flowchart illustrating an example operation of changing a lane setting in an example electronic device according to various embodiments. Operations of FIG. 4 described below may represent, for example, various embodiments of operations 330 and/or 360 of FIG. 3.

Referring to FIG. 4, in operation 410, the electronic device 101 (or the processor 120) according to various embodiments may determine whether a lane change request is generated by the application 211.

According to an embodiment, as described below with reference to FIG. 5, the lane change request may include a lane increase request for high-rate data transmission-based service execution. The high-rate data transmission-based service may include, for example, at least one of a high-resolution shooting mode, a high-speed shooting mode, or a continuous shooting mode. However, this is only illustrative, and the example embodiments are not limited thereto. For example, the lane change request may include a lane reduction request for low-rate data transmission-based service execution.

According to various embodiments, when a lane change request is not generated by the application 211, in operation 440, the electronic device 101 (or the processor 120) may process data through the currently operating lane(s) (e.g., the first group of lanes and the second group of lanes).

According to various embodiments, when the lane change request is generated by the application 211, in operation 420, the electronic device 101 (or processor 120) may change the operating lane(s) based on the request. According to an embodiment, the electronic device 101 may operate by increasing the number of lanes or decreasing the number of lanes based on the lane change request.

For example, when the lane increase request is generated in a situation in which lanes of the first group are operated (e.g., a situation in which the first transmission lane 241 and the first reception lane 245 are operated), the electronic device 101 may increase the transmission lane (e.g., additional operation of the second transmission lane 243) or the reception lane (e.g., additional operation of the second reception lane 247), or may increase the transmission lane and the reception lane (e.g., additional operation of the second transmission lane 243 and the second reception lane 247).

As another example, when the lane decrease request is generated in a situation in which lanes of the second group are operated (e.g., a situation in which the first transmission lane 241, the second transmission lane 243, the first reception lane 245 and the second reception lane 247 are operated), the electronic device 101 may reduce the transmission lane (e.g., non-operation of the second transmission lane 243) or the reception lane (e.g., non-operation of the second reception lane 247), or may reduce the transmission lane and the reception lane (e.g., non-operation of the second transmission lane 243 and the second reception lane 247).

In this regard, the electronic device 101 may select a target port to be increased or decreased among ports (e.g., the first port 231 to the fourth port 234) of the host interface 217, and change the lane between the host 210 and the device 220 by providing information related to the selected target port to the device 220.

According to various embodiments, in operation 430, the electronic device 101 (or the processor 120) may process data through the changed lane(s).

Figure 5:
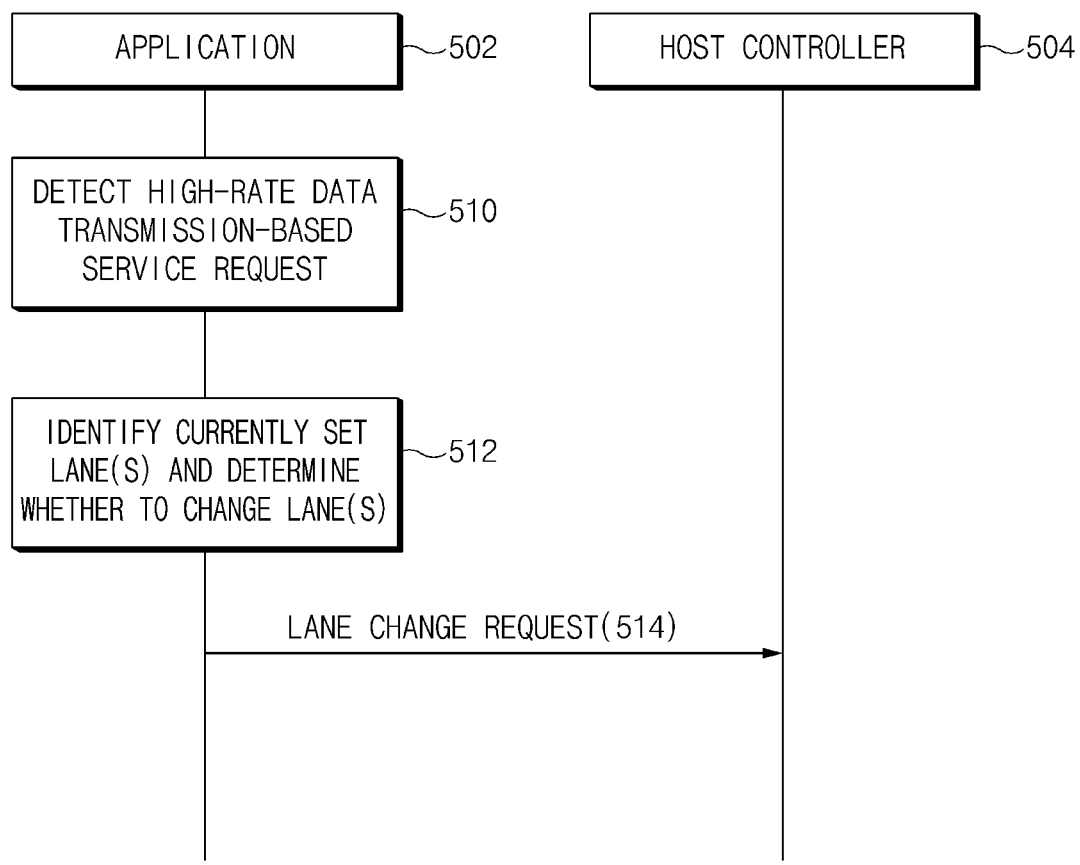
FIG. 5 is a flowchart illustrating an example operation of generating a lane change request in an electronic device according to various embodiments.

FIG. 5 is a flowchart illustrating an example operation of generating a lane change request in an example electronic device according to various embodiments.

Referring to FIG. 5, a lane change request according to various embodiments may be generated by an application 502 (e.g., the application 211) and may be provided to a host controller 504 (e.g., the host controller 215 or the lane determination module 255).

According to various embodiments, in operation 510, the application 502 may detect a high-rate data transmission-based service request. As described above, a high-rate data transmission-based service may include at least one of a high-resolution shooting mode, a high-speed shooting mode, or a continuous shooting mode.

According to various embodiments, in response to the high-rate data transmission-based service request, in operation 512, the application 502 may obtain lane-related information and determine the possibility of lane change. The lane-related information may include information on lane(s) currently set between the host 210 and the device 220 and/or information on lane(s) that may be formed between the host 210 and the device 220. According to an embodiment, the driver 213 may generate a file system (e.g., a sysfs node) in which information related to the device 220 is recorded, and the application 502 may obtain lane-related information by calling the file system. In this regard, the application 502 may determine whether a lane(s) (e.g., the second group of lanes) capable of high-speed data processing can be formed between the host 210 and the device 220 based on the lane-related information.

According to various embodiments, when it is determined that a lane change is possible, the application 502 may request a lane change from the host controller 504 in operation 514. According to an embodiment, the application 502 may directly request a lane change from the host controller 504 or record the lane change request in a file system (e.g., a sysfs node). Accordingly, the application 502 may execute a high-rate data transmission-based service (e.g., a high-resolution shooting mode, a high-speed shooting mode, or a continuous shooting mode) in a state in which the lane is changed.

Figure 6:
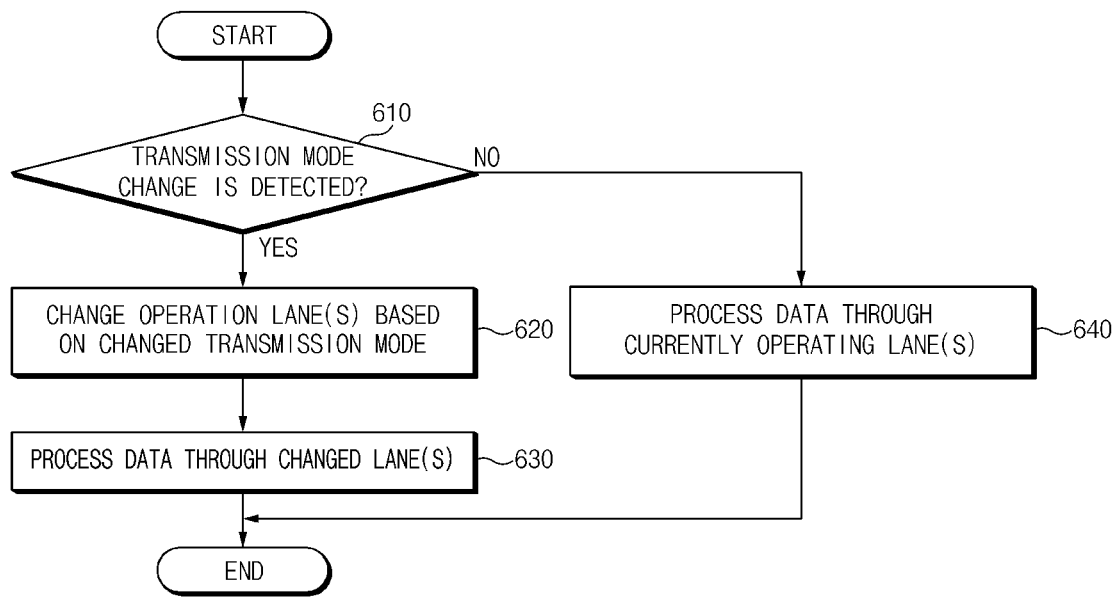
FIG. 6 is a flowchart illustrating an example operation of changing a lane setting in an example electronic device according to various embodiments.

FIG. 6 is a flowchart illustrating an example operation of changing a lane setting in an example electronic device according to various embodiments. Operations of FIG. 6 described below may, for example, represent various embodiments of operations 330 and/or 360 of FIG. 3.

Referring to FIG. 6, in operation 610, the electronic device 101 (or the processor 120) according to various embodiments may determine whether the transmission mode determined by the driver 213 is changed. The transmission mode may refer, for example, to a data transmission rate (e.g., gear level) set between the host 210 and the device 220.

According to various embodiments, when a change in transmission mode is not detected, in operation 640, the electronic device 101 (or the processor 120) may process data through a currently operating lane(s) (e.g., the first group of lanes or the second group of lanes).

According to various embodiments, when a transmission mode change is detected, in operation 620, the electronic device 101 (or the processor 120) may change the operation lane(s) based on the changed transmission mode. According to an embodiment, the electronic device 101 may operate by increasing or decreasing the number of lanes based on the transmission mode change.

For example, when changing from a low-rate transmission mode (e.g., Gear level 2 or lower) to a high-rate transmission mode (e.g., Gear level 3 or higher), the electronic device 101 may increase the number of lanes. To the contrary, when changing from the high-rate transmission mode to the low-rate transmission mode, the electronic device 101 may reduce the number of lanes. In this regard, the electronic device 101 may select a target port to increase or decrease from ports (e.g., the first port 231 to the fourth port 234) of the host interface 217, and change the lane between the host 210 and the device 220 by providing information on the selected target port to the device 220.

According to various embodiments, in operation 630, the electronic device 101 (or the processor 120) may process data through the changed lane(s).

Figure 7:
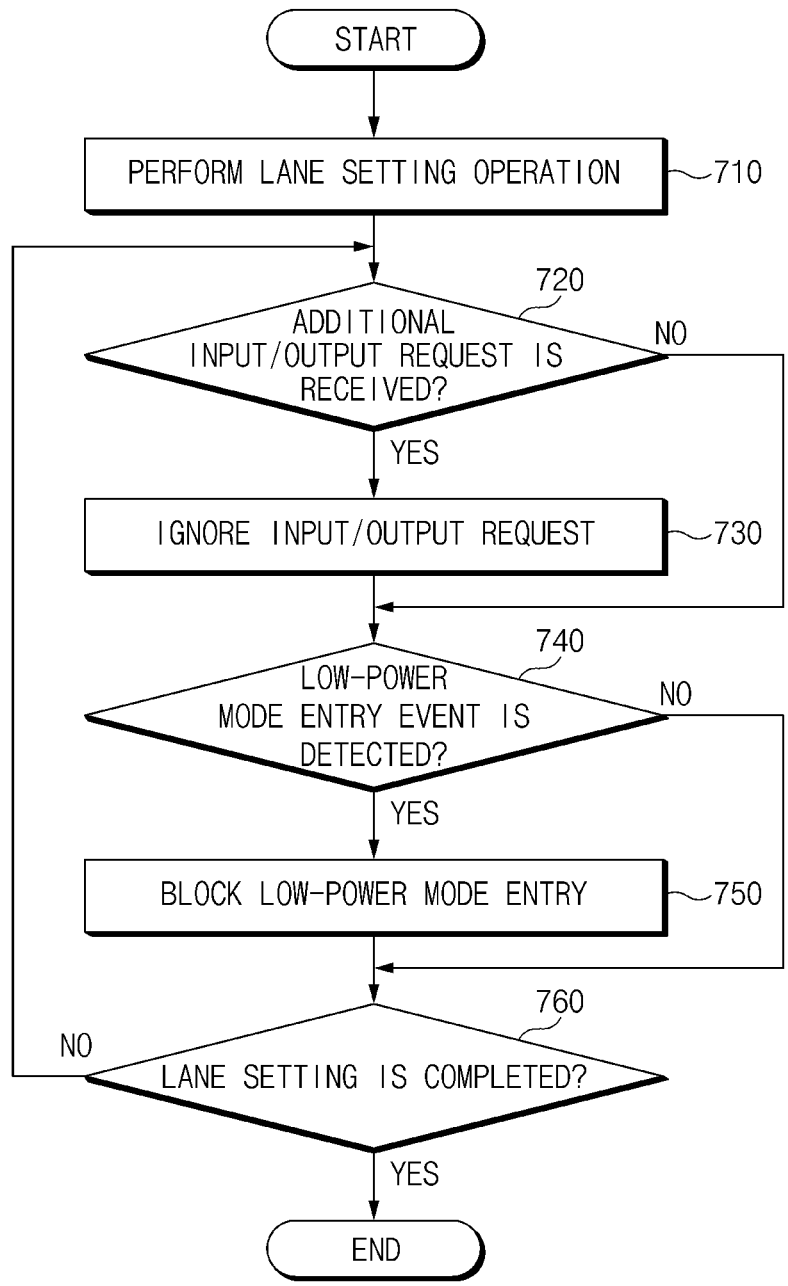
FIG. 7 is a flowchart illustrating an example lane setting operation of an example electronic device according to various embodiments.

FIG. 7 is a flowchart illustrating an example lane setting operation of an example electronic device according to various embodiments. Operations of FIG. 7 described below may, for example, represent various embodiments of operations 320 and/or 360 of FIG. 3.

Referring to FIG. 7, in operation 710, the electronic device 101 (or the processor 120) according to various embodiments may perform a lane setting operation (or a lane changing operation). According to an embodiment, the electronic device 101 may perform an operation of determining a lane operation scheme based on at least one of a data processing scheme, a data processing amount, or whether data is continuously processed. Additionally or alternatively, when there is a data input/output request generated before performing the lane setting operation, the electronic device 101 may process the corresponding input/output request and then perform the lane setting operation.

According to various embodiments, in operation 720, the electronic device 101 (or the processor 120) may determine whether a data input/output request is additionally obtained. According to an embodiment, the electronic device 101 may determine whether a data input/output request is additionally obtained while setting an operation lane.

According to various embodiments, when a data input/output request is additionally obtained, the electronic device 101 (or the processor 120) may ignore the obtained data input/output request in operation 730. According to an embodiment, when the electronic device 101 processes an additionally obtained data input/output request before the lane setting operation is completed, the lane setting operation may be stopped. Accordingly, the electronic device 101 may ignore the additionally obtained data input/output request as part of an operation of preventing the lane setting operation from being stopped.

According to various embodiments, after a data input/output request is not additionally obtained or the obtained data input/output request is ignored, in operation 740, the electronic device 101 (or the processor 120) may determine whether a low power mode entry event occurs. The low power mode may, for example, be an operation of controlling a function of the electronic device 101 with minimum power. Additionally or alternatively, the electronic device 101 may complete the processing of the input/output being processed when there is an input/output request being processed before determining the low power mode entry event. In this regard, the electronic device 101 may drive a pre-designated timer and complete processing of input/output being processed while the timer is running. Accordingly, the electronic device 101 may determine whether a low power mode entry event occurs after processing the error even though an error for the input/output request occurs.

According to various embodiments, when a low power mode event is detected, in operation 750, the electronic device 101 (or the processor 120) may block entry into the low power mode. According to an embodiment, when the electronic device 101 enters the low power mode before the lane setting operation is completed, the lane setting operation may be stopped. Accordingly, the electronic device 101 may block entry into the low power mode as part of an operation of preventing the lane setting operation from being stopped.

According to various embodiments, in operation 760, the electronic device 101 (or the processor 120) may determine whether the lane setting operation is completed. According to an embodiment, the electronic device 101 may repeatedly perform at least one of operations 720 to 750 until the lane setting operation is completed.

Figure 8:
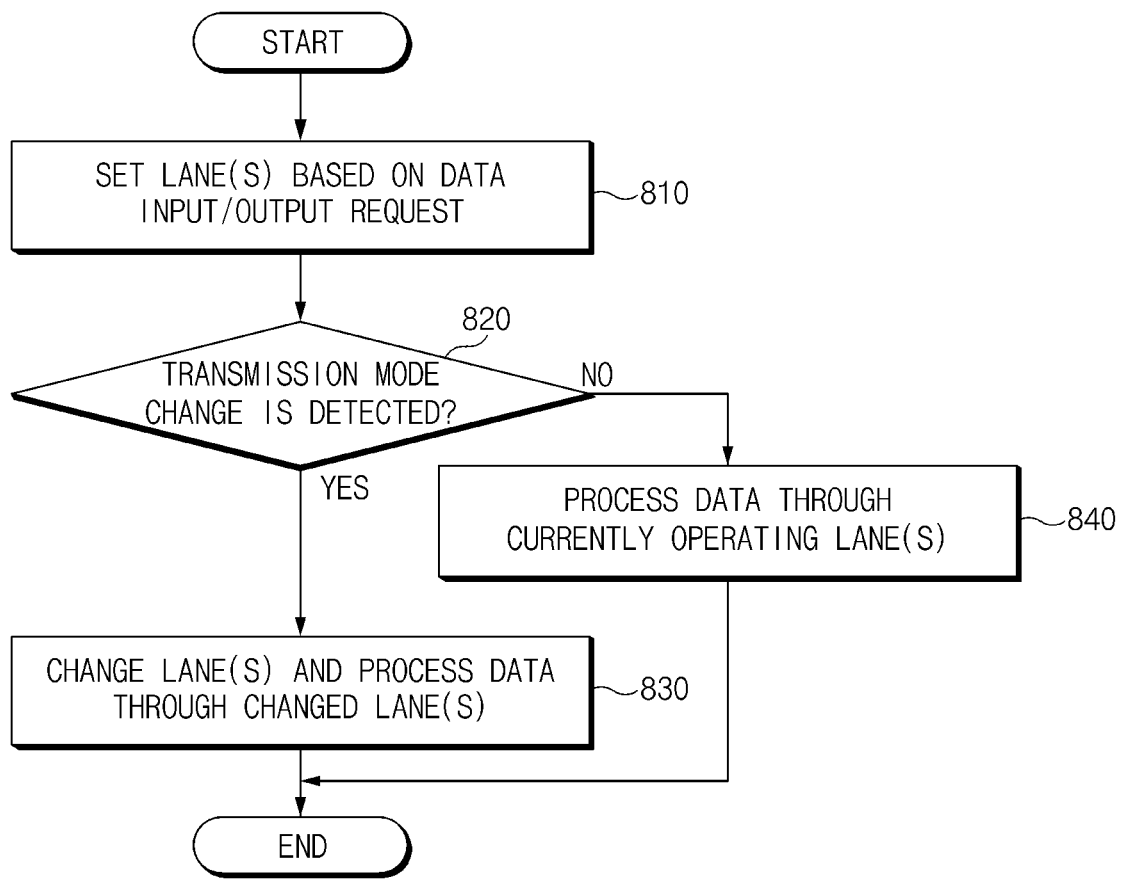
FIG. 8 is a flowchart illustrating an example operation of forming a lane in an example electronic device according to various embodiments.

FIG. 8 is a flowchart illustrating an example operation of forming a lane in an example electronic device according to various embodiments.

Referring to FIG. 8, in operation 810, the electronic device 101 (or the processor 120) according to various embodiments may set an operation lane(s) based on a data input/output request. According to an embodiment, the electronic device 101 may determine, as an operation lane(s), the minimum lane capable of supporting data processing performance required for the operation of the device 220 corresponding to the data input/output request. For example, the electronic device 101 may set an operation lane(s) through operations 310 and 320 described above with reference to FIG. 3.

According to various embodiments, in operation 820, the electronic device 101 (or the processor 120) may determine whether a transmission mode change is detected. The transmission mode may refer, for example, to a data transmission rate (e.g., a gear level) set between the host 210 and the device 220.

According to various embodiments, when a transmission mode change is not detected, in operation 840, the electronic device 101 (or the processor 120) may process data through the currently operating lane(s) (e.g., the first group of lanes or the second group of lanes).

According to various embodiments, when a transmission mode change is detected, in operation 830, the electronic device 101 (or the processor 120) may change the operation lane(s) based on the changed transmission mode, and process data through the changed operation lane(s). According to an embodiment, the electronic device 101 may operate by increasing or decreasing the number of lanes based on the transmission mode change. In this regard, the electronic device 101 may perform operations similar to or identical to operations 620 and 630 described above with reference to FIG. 6.

Figure 9:
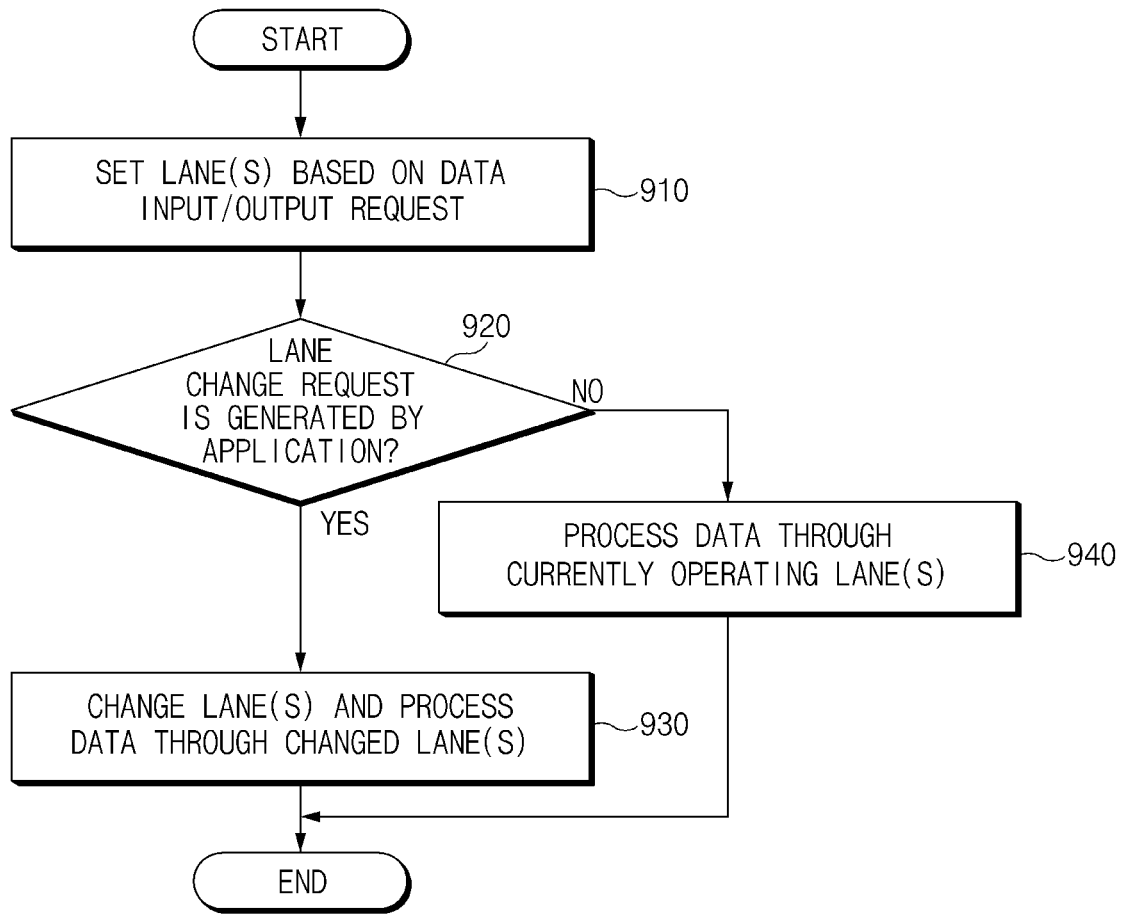
FIG. 9 is a flowchart illustrating an example operation of forming a lane in an example electronic device according to various embodiments.

FIG. 9 is a flowchart illustrating an example operation of forming a lane in an example electronic device according to various embodiments of the disclosure.

Referring to FIG. 9, in operation 910, the electronic device 101 (or the processor 120) according to various embodiments may set an operation lane(s) based on a data input/output request. According to an embodiment, the electronic device 101 may determine, as an operation lane(s), the minimum lane(s) capable of supporting data processing performance required for the operation of the device 220 corresponding to the data input/output request. For example, the electronic device 101 may set an operation lane(s) through operations 310 and 320 described above with reference to FIG. 3.

According to various embodiments, in operation 920, the electronic device 101 (or the processor 120) may determine whether a lane change request is generated by the application 211. As described above, the lane change request may include a lane increase request for high-rate data transmission-based service execution. However, this is only illustrative, and the example embodiments are not limited thereto. For example, the lane change request may include a lane reduction request for low-rate data transmission-based service execution.

According to various embodiments, when any lane change requests are not detected, in operation 940, the electronic device 101 (or the processor 120) may process data through the currently operating lane(s) (e.g., the first group of lanes or the second group of lanes).

According to various embodiments, when a lane change request is detected, in operation 930, the electronic device 101 (or the processor 120) may change the operation lane(s) based on the lane change request, and process data through the changed operation lane(s). According to an embodiment, the electronic device 101 may operate by increasing or decreasing the number of lanes based on the lane change request. In this regard, the electronic device 101 may perform operations similar to or identical to operations 420 and 430 described above with reference to FIG. 4.

Figure 10:
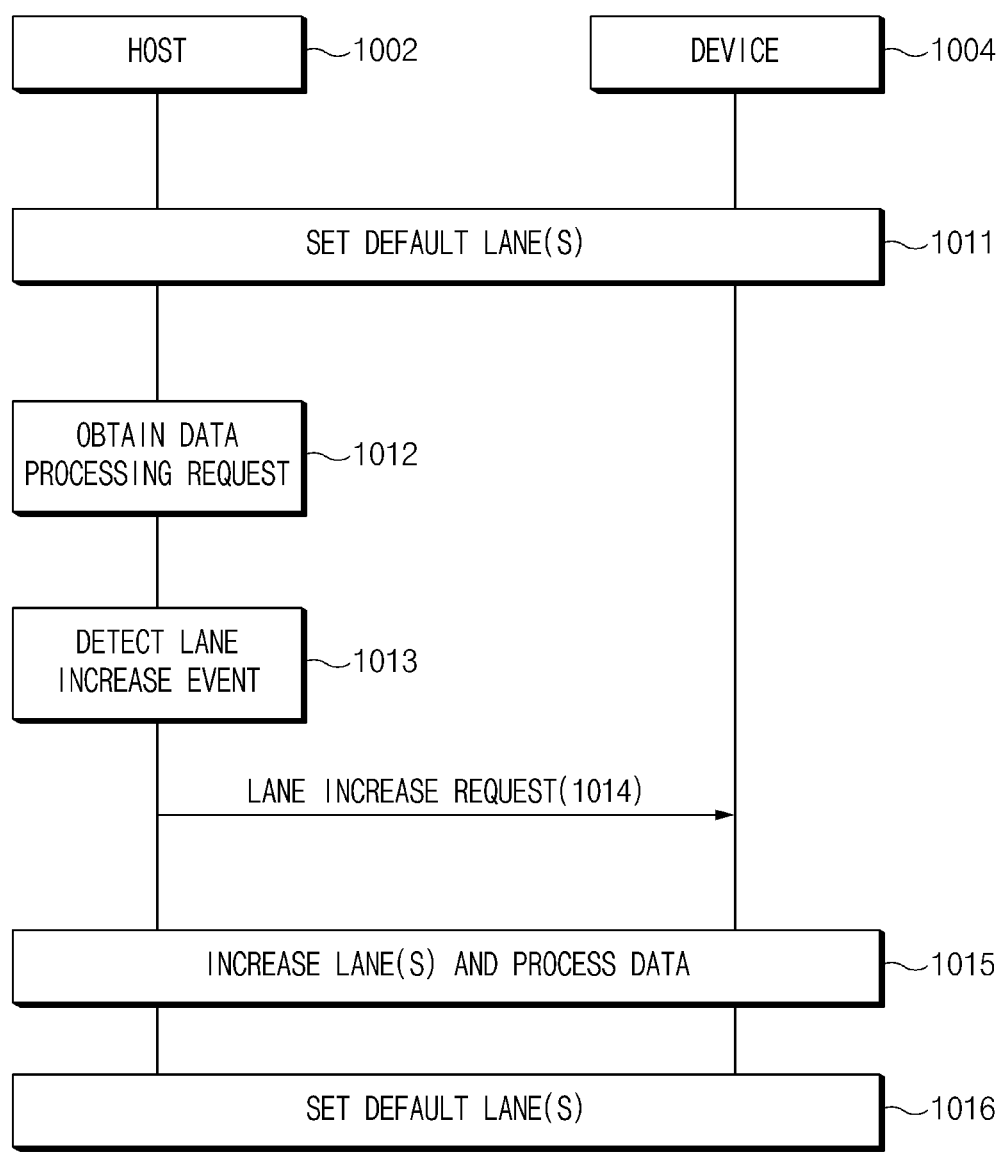
FIG. 10 is a diagram illustrating an example operation of forming a lane in an example data processing system according to various embodiments.

FIG. 10 is a diagram illustrating an example operation of forming a lane in an example data processing system according to various embodiments.

Referring to FIG. 10, a data processing system 1000 according to various embodiments may include a host 1002 (e.g., the host 210) and a device 1004 (e.g., the device 220).

According to various embodiments, in operation 1011, the host 1002 and the device 1004 may set a default lane(s). The default lane(s) may be a lane(s) of the first group described above. According to an embodiment, the host 1002 and the device 1004 may set one transmission lane and one reception lane.

According to various embodiments, in operation 1012, the host 1002 may obtain a data processing request (or a data input/output request). The data processing request may include an input request indicating data input (e.g., writing) to the device 220 or an output request indicating data output (e.g., reading) from the device 220. According to an embodiment, the host 1002 may identify a data input/output request provided to the driver 213 by the application 211.

According to various embodiments, in operation 1013, the host 1002 may detect a lane increase event. According to an embodiment, the lane increase event may include a situation in which an output request indicating data output (e.g., reading) is detected. According to an embodiment, the lane increase event may include at least one of a situation in which a data processing request exceeding a predetermined reference amount (e.g., a request for processing high-capacity data) is detected, a situation in which a continuous data processing request is detected, a situation in which second-level resource usage is detected, a situation in which the high-speed transmission rate is determined by the driver 213, or a situation in which a lane increase request is received by the application 211.

According to various embodiments, in operation 1014, in response to detecting a lane increase event, the host 1002 may request a lane increase from the device 1004. In this regard, the host 1002 may select a port to be activated among ports (e.g., the first port 231 to the fourth port 234) of the host interface 217, and provide information related to the selected port to the device 1004.

According to various embodiments, in operation 1015, the host 1002 and the device 1004 may increase lanes and process data through the increased lanes.

According to various embodiments, in operation 1016, the host 1002 and the device 1004 may set the increased lanes as default lanes after completing data processing.

Figure 11:
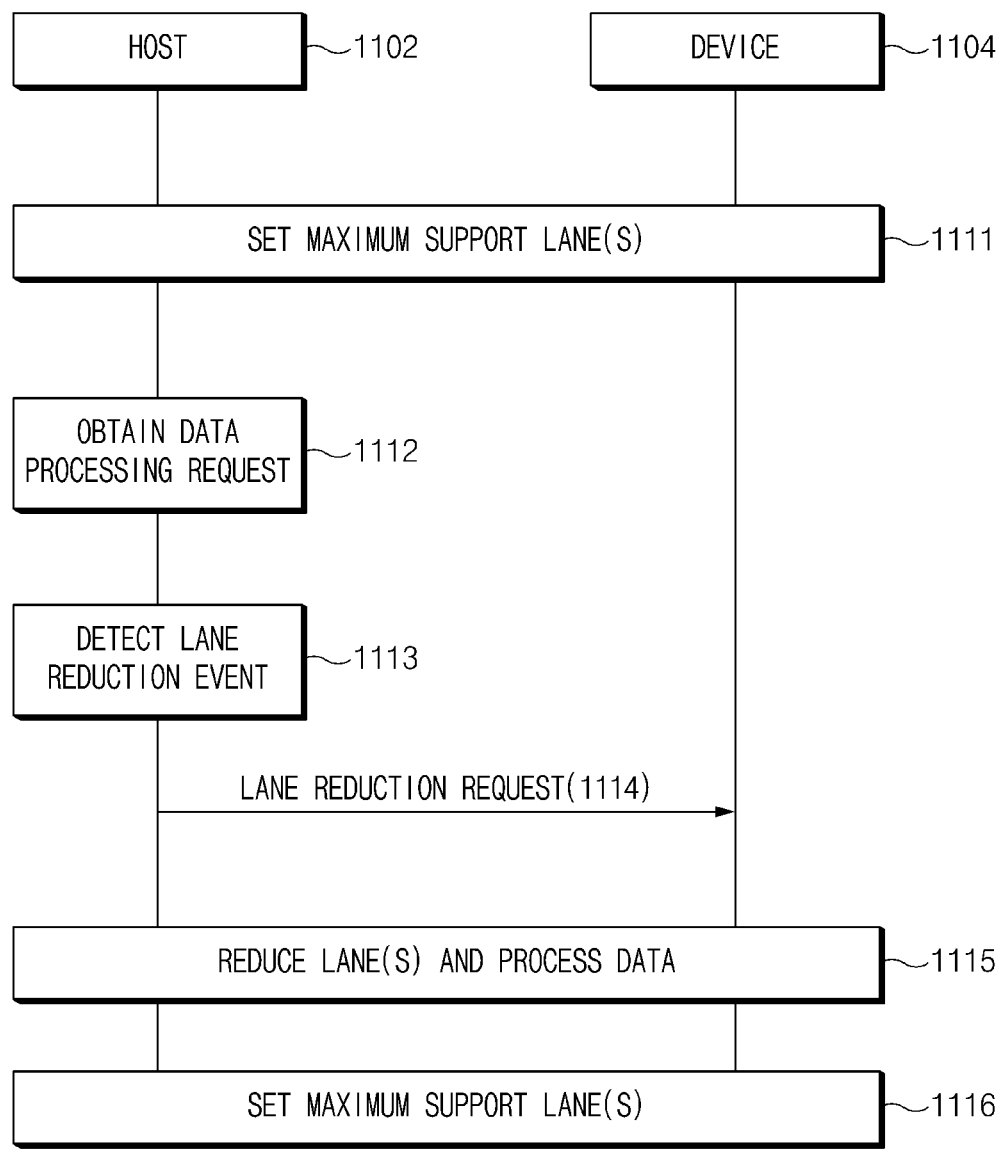
FIG. 11 is a diagram illustrating an example operation of forming a lane in an example data processing system according to various embodiments.

FIG. 11 is a diagram illustrating an example operation of forming a lane in an example data processing system according to various embodiments.

Referring to FIG. 11, a data processing system 1100 according to various embodiments may include a host 1102 (e.g., the host 210) and a device 1104 (e.g., the device 220).

According to various embodiments, in operation 1111, the host 1102 and the device 1104 may set a maximum support lane(s). The maximum support lane(s) may be lane(s) of the second group described above. According to an embodiment, the host 1102 may check the number of lane(s) between the host 1102 and the device 1104 based on a capability exchange operation and set the maximum support lane(s) based on the check result. For example, when the host 1102 supports up to two lanes and the device 1104 supports up to two lanes, two lanes may be established between the host 1102 and the device 1104.

According to various embodiments, in operation 1112, the host 1102 may obtain a data processing request (or a data input/output request). The data processing request may, for example, include an input request indicating data input (e.g., writing) to the device 1104 or an output request indicating data output (e.g., reading) from the device 1104. According to an embodiment, the host 1102 may identify a data input/output request provided to the driver 213 by the application 211.

According to various embodiments, in operation 1113, the host 1102 may detect a lane reduction event. According to an embodiment, the lane reduction event may include a situation in which an output request indicating data input (e.g., writing) is detected. According to an embodiment, the lane reduction event may include at least one of a situation in which a request for processing data that does not exceed a predetermined reference amount (e.g., a request for processing low-capacity data) is detected, a situation in which a non-continuous data processing request is detected, a situation in which a low transmission rate is determined by the driver 213, or a situation in which a lane reduction request is received by the application 211.

According to various embodiments, in operation 1114, in response to detecting a lane reduction event, the host 1102 may request a lane reduction from the device 1104. In this regard, the host 1102 may select a port to be deactivated from among ports (e.g., the first port 231 to the fourth port 234) of the host interface 217, and provide information related to the selected port to the device 1104.

According to various embodiments, in operation 1115, the host 1102 and the device 1104 may reduce a lane(s) and process data through the reduced lane(s).

According to various embodiments, in operation 1116, the host 1102 and the device 1104 may set the reduced lane(s) as the maximum support lane(s) after completing data processing.

The electronic device 101 (or the data processing apparatus 200) according to various embodiments may dynamically adjust the number of activated lanes according to an operating state of the electronic device 101, so that unnecessary power consumption is prevented.

Table 3 below is a table for comparing performance of an electronic device (e.g., an electronic device 12) according to various example embodiments and performance of an electronic device (e.g., an electronic device 11) according to a comparative embodiment, and Table 4 is a table for comparing current consumption of an electronic device (e.g., the electronic device 12) according to various embodiments and an current consumption of an electronic device (e.g., the electronic device 11) according to a comparative embodiment.

TABLE 3

| Exynos9820 & UFS 2.1 MLC 64G | Electronic device 11 (TX 2lane + RX 2lane) | Electronic device 12 (TX 2lane + RX 1lane) |
|---|---|---|
| Sequential Read | 895 (MB/S) | 890 (MB/S) |
| Sequential Write | 207 (MB/S) | 205 (MB/S) |

TABLE 4

| User case | Electronic device 11 (TX 2lane + RX 2lane) | Electronic device 12 (TX 2lane + RX 1lane) |
|---|---|---|
| Menu navigation scenario | 1.6 | 1.3 |
| Streaming scenario | 1 | 1 |
| SNS scenario | 2.6 | 2 |
| Game scenario | 0.8 | 0.6 |
| WIFI scenario | 1.3 | 1.3 |

In detail, referring to Table 3, it may be understood that the performance of an electronic device (e.g., the electronic device 11) according to a comparative embodiment which operates two transmission lanes (e.g., TX 2lane) and two reception lanes (e.g., RX 2lane) is quite similar to the performance of an electronic device (e.g., the electronic device 12) according to various embodiments which operates two transmission lanes (e.g., TX 2lane) and one reception lane (e.g., RX 1lane).

In addition, referring to Table 4, it may be understood that the current consumption of an electronic device (e.g., the electronic device 12) according to various embodiments, which operates two transmission lanes and one reception lane, is reduced compared to the electronic device (e.g., the electronic device 11) according to a comparative embodiment, which operates two transmission lanes and two reception lanes.

For example, when the current consumption in a situation (streaming scenario) in which a streaming service (e.g., an example of the second situation described above with reference to Table 2) is used is compared with the current consumption in a situation (Wi-Fi scenario) in which data is transmitted using short-range communication (e.g., an example of the fourth situation described above with reference to Table 2), the current consumption of an electronic device (e.g., the electronic device 11) according to a comparative embodiment may be similar to the current consumption of an electronic device (e.g., the electronic device 12) according to various embodiments.

However, when comparing the current consumption in a situation (menu navigation scenario) in which the menu navigation function is executed (e.g., an example of the first situation described above with reference to Table 2), a situation (game scenario) in which the game function is executed (e.g., an example of the third situation described above with reference to Table 2), and a situation (SNS scenario) in which the SNS service is executed (e.g., an example of the third situation described above with reference to Table 2), it may be understood that the current consumption of an electronic device (e.g., the electronic device 12) according to various embodiments is reduced compared to the current consumption of an electronic device (e.g., the electronic device 11) according to a comparative embodiment.

According to various example embodiments, a method of operating an electronic device (e.g., the electronic device 101) including an interface (e.g., the host interface 217) supporting a plurality of transmission lanes and a plurality of reception lanes may include identifying an input/output request generated by an application (e.g., the application 211), processing the data through a first group of lanes of the interface when a data input (writing) request is generated by the application, processing the data through a second group of lanes of the interface, in which a greater number of lanes than the first group of lanes is activated, when a data output (reading) request is generated by the application, and processing the data through the second group of lanes when an amount of used resources of the electronic device exceeds a specified level in a state in which the data is processed through the first group of lanes.

According to various example embodiments, the method may further include processing the data through the first group of lanes when the amount of used resources of the electronic device does not exceed the specified level in a state in which the data is processed through the second group of lanes.

According to various example embodiments, the method may further include changing a lane(s) for processing the data in response to a lane change request when the lane change request is generated by the application in a state in which the data is processed through the first group of lanes or the second group of lanes.

According to various example embodiments, the lane change request may include a lane increase request for high-rate data transmission-based service execution and a lane decrease request for low-rate data transmission-based service execution.

According to various example embodiments, the method may further include changing a lane(s) for processing the data based on a changed data transmission mode when a data transmission mode is changed in a state in which the data is processed through the first group of lanes or the second group of lanes. According to an embodiment, the data transmission mode may include a mode supporting a high data transmission rate and a mode supporting a low data transmission rate.

According to various example embodiments, the method may further include ignoring processing of an input/output request additionally generated by the application while processing the data through the first group of lanes or the second group of lanes.

According to various embodiments, the method may further include restricting the electronic device from entering a low power mode while processing the data through the first group of lanes or the second group of lanes.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a storage device including a device interface and a non-volatile memory;
an interface configured to support a plurality of transmission lanes and plurality of reception lanes and configured to communicate with the storage device; and
at least one processor configured to control processing of data through the interface based on an input/output request generated by an application,
wherein one or more of the at least one processor is configured to:
process the data through a first group of lanes when the input/output request indicates data input,
process the data through a second group of lanes in which a greater number of lanes than the first group of lanes is activated when the input/output request indicates data output, and
process the data through the second group of lanes when an amount of used resources of the electronic device exceeds a specified level in a state in which the data is processed through the first group of lanes.

2. The electronic device of claim 1, wherein one or more of the at least one processor is configured to:
process the data through the first group of lanes when the amount of used resources of the electronic device does not exceed the specified level in a state in which the data is processed through the second group of lanes.

3. The electronic device of claim 1, wherein one or more of the at least one processor is configured to change a lane for processing the data based on a lane change request when the lane change request is generated by the application in a state in which the data is processed through the first group of lanes or the second group of lanes, and
wherein the lane change request includes a lane increase request for high-rate data transmission-based service execution or a lane decrease request for low-rate data transmission-based service execution.

4. The electronic device of claim 1, wherein one or more of the at least one processor is configured to change a lane for processing the data based on a changed data transmission mode when a data transmission mode is changed in a state in which the data is processed through the first group of lanes or the second group of lanes, and
wherein the data transmission mode includes a mode supporting a high data transmission rate or a mode supporting a low data transmission rate.

5. The electronic device of claim 1, wherein one or more of the at least one processor is configured to ignore processing of an input/output request additionally generated by the application while processing the data through the first group of lanes or the second group of lanes.

6. The electronic device of claim 1, wherein one or more of the at least one processor is configured to restrict the electronic device from entering a low power mode while processing the data through the first group of lanes or the second group of lanes, and complete processing of the input/output request.

7. The electronic device of claim 1, wherein at least some lanes of the first group of lanes are included in the second group of lanes.

8. The electronic device of claim 1, wherein the storage device includes a universal flash storage device.

9. A method of operating an electronic device including an interface supporting a plurality of transmission lanes and a plurality of reception lanes, the method comprising:
identifying an input/output request generated by an application;
processing data through a first group of lanes of the interface when a data input request is generated by the application;
processing the data through a second group of lanes of the interface, in which a greater number of lanes than the first group of lanes is activated, when a data output request is generated by the application; and processing the data through the second group of lanes when an amount of used resources of the electronic device exceeds a specified level in a state in which the data is processed through the first group of lanes.

10. The method of claim 9, further comprising:
processing the data through the first group of lanes when the amount of used resources of the electronic device does not exceed the specified level in a state in which the data is processed through the second group of lanes.

11. The method of claim 9, further comprising:
changing a lane for processing the data based on a lane change request when the lane change request is generated by the application in a state in which the data is processed through the first group of lanes or the second group of lanes.

12. The method of claim 11, wherein the lane change request includes a lane increase request for high-rate data transmission-based service execution or a lane decrease request for low-rate data transmission-based service execution.

13. The method of claim 9, further comprising:
changing a lane for processing the data based on a changed data transmission mode when a data transmission mode is changed in a state in which the data is processed through the first group of lanes or the second group of lanes, and
wherein the data transmission mode includes a mode supporting a high data transmission rate or a mode supporting a low data transmission rate.

14. The method of claim 9, further comprising:
ignoring processing of an input/output request additionally generated by the application while processing the data through the first group of lanes or the second group of lanes.

15. The method of claim 9, further comprising:
restricting the electronic device from entering a low power mode while processing the data through the first group of lanes or the second group of lanes.

16. A data processing system comprising:
a host including a first interface supporting a plurality of lanes and an application; and
a device including a second interface supporting a plurality of lanes,
wherein the host is configured to:
determine, as a first activation target, a first group of lanes and notify the device of the first activation target when an input/output request indicating data input is generated by the application,
determine, as a second activation target, a second group of lanes and notify the device of the second activation target when an input/output request indicating data output is generated by the application, and
determine the second activation target and notify the device of the second activation target when an amount of used resources of the host exceeds a specified level in a state in which the second group of lanes is determined as the second activation target, and
wherein the device is configured to activate a lane corresponding to the first activation target or the second activation target based on a notification from the host.

17. The data processing system of claim 16, wherein a number of lanes of the first group is less than a number of lanes of the second group.

18. The data processing system of claim 17, wherein the device includes a universal flash storage device.

19. The data processing system of claim 17, wherein the host is configured to change an activated lane based on a lane change request and notify the device when the lane change request is generated by the application in a state in which the first group of lanes is determined as the first activation target.

20. The data processing system of claim 17, further comprising:
a driver configured to control a data transmission mode,
wherein the host is configured to change an activated lane based on a changed data transmission mode and notify the device when the data transmission mode is changed by the driver in a state in which the first group of lanes is determined as the first activation target.

* * * * *